United States Patent [19]

Takahashi et al.

[11] Patent Number: 4,814,761
[45] Date of Patent: Mar. 21, 1989

[54] METHOD AND APPARATUS FOR COMMUNICATION CONTROL IN LOOP COMMUNICATION NETWORK

[75] Inventors: Kenitiro Takahashi, Ibaraki; Yukichi Ueno, Katsuta, both of Japan

[73] Assignee: Hitachi, Ltd., Tokyo, Japan

[21] Appl. No.: 23,633

[22] Filed: Mar. 9, 1987

[30] Foreign Application Priority Data

Mar. 7, 1986 [JP] Japan .................................. 61-48435

[51] Int. Cl.⁴ ............................................. H04Q 1/00
[52] U.S. Cl. .......................... 340/825.05; 340/825.08; 340/825.14; 455/600
[58] Field of Search ...................... 340/825.05, 825.08, 340/825.06, 825.1, 825.11, 825.14, 825.51, 825.65; 455/600, 601, 606, 607, 617; 370/85, 86, 100

[56] References Cited

U.S. PATENT DOCUMENTS

| | | | |
|---|---|---|---|
| 3,786,419 | 6/1974 | Nick | 370/86 X |
| 3,824,545 | 7/1974 | Brenner et al. | 370/85 X |
| 4,024,501 | 5/1977 | Herring et al. | 370/85 X |
| 4,255,741 | 3/1981 | Peterson | 340/825.05 X |
| 4,386,426 | 5/1983 | Pugh | 370/85 |
| 4,637,013 | 1/1987 | Nakamura | 370/85 |

Primary Examiner—Ulysses Weldon
Attorney, Agent, or Firm—Antonelli, Terry & Wands

[57] ABSTRACT

In a communication network in which a main station and several I/O systems are connected by a closed-loop communication line, the communication line includes a data channel and a clock pulse channel extending in parallel with the data channel. Predetermined data bit lengths are allotted to the individual I/O systems. A train of clock pulses, the number of which is equal to the sum of the data bit lengths alloted to the I/O systems, is supplied from the main station to the I/O systems, and data arranged in the order of reception by the I/O systems are transmitted from the main station to the I/O systems in synchronism with the clock pulses. In each of a number of I/O systems, the clock pulses, corresponding to the number of data bits allotted to the particular station, is counted to fetch the data supplied while the clock pulses are being counted. At the same time, the I/O system sends out data generated therein toward the main station while the clock pulses are being counted. In the other period of time, data and clock pulses supplied to that I/O system are transferred intact to the I/O system in the next stage.

11 Claims, 4 Drawing Sheets

FIG. 4
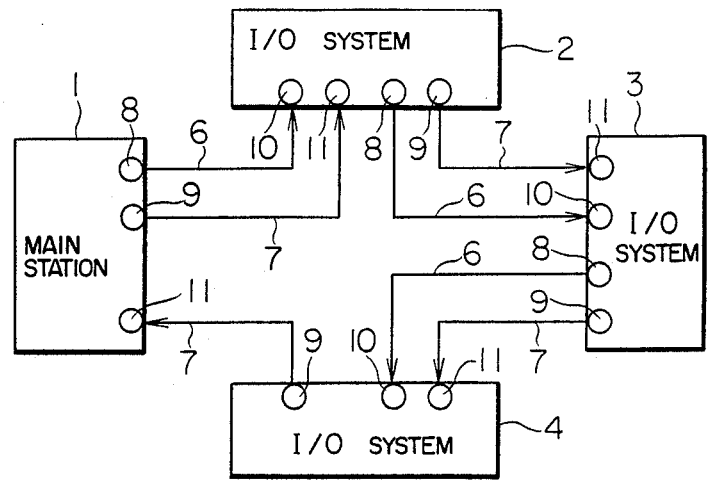
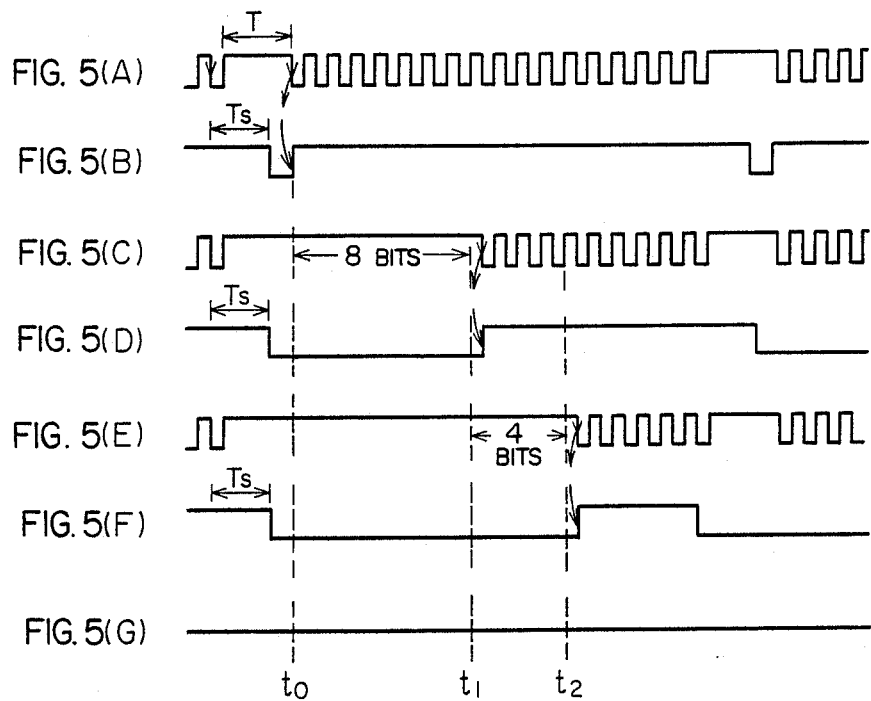
FIG. 5(A)
FIG. 5(B)
FIG. 5(C)
FIG. 5(D)
FIG. 5(E)
FIG. 5(F)
FIG. 5(G)

METHOD AND APPARATUS FOR COMMUNICATION CONTROL IN LOOP COMMUNICATION NETWORK

FIELD OF THE INVENTION

This invention relates to a method and apparatus for controlling communications in a communication system having a loop communication network. More particularly, the present invention relates to a method and apparatus of the type described above which are suitable for application to a communication system in which a plurality of terminal stations, each including an I/O (input/output) unit, are connected to such a communication network to make high-speed communications between the terminal stations and a main station connected in the communication network.

BACKGROUND OF THE INVENTION

A so-called local area network has recently been developed in which a plurality of microcomputers and terminal units are connected to each other by a communication line or channel so that the network can be efficiently utilized for communications between microcomputers and the terminal units.

Various kinds of local area networks are introduced and explained, for example, in a magazine entitled "Nikkei Electronics" pp. 185–238 and published on Apr. 22, 1985. As one of the local area networks, there is described a communication system in which a main station including a computer is connected by a loop communication line with a plurality of various I/O systems having terminal units connected thereto so as to transmit and receive data between the main station and the individual I/O systems.

Further, various kinds of local area network systems are explained in a book entitled "Microcomputer Local Network" pp. 11–31, written by T. Mizuno and published by Sanpo Shuppan K.K.

In most of the communication systems described above, a destination code is added to transmitted data to specify the destination of the transmitted data, and, when so required, information including the total number of bits of the transmitted data and an end code are also added. That is, the destination code is detected to determine the data receiving station, and the total number of bits is used to determine the amount of transmitted data. In this case, it is necessary to provide means for judging whether the communication line or channel is presently idle and available or not. Further, the data transmitting station must have a capability of computing the destination address and the total number of bits of transmitted data and sending out the data to the communication channel according to the communication data format. The data receiving station must have a capability of receiving all the data transmitted thereto by way of the communication channel and determining whether the data is directed to that station or not and a capability of informing the data transmitting station of the completion of reception of the data when it has received the data directed to that station.

Because of the capability requirements described above, the main station and the I/O systems of the terminal stations require complex structures, and the software required for controlling the operations of the stations is complex, resulting in relatively low reliability of the communication system. Also, the cost of the communication system inevitably become high. Although such a communication system is preferable for transmission of a large amount of data at one time, the data transmission efficiency is not high when the amount of data to be transmitted at one time is not large. Further, since the transmitted data includes address data, etc., other than the necessary information, an extended period of time is required for the transmission and reception of the data. When, for example, a pulse motor in one of the terminal stations is to be controlled by an instruction signal transmitted from the main station, several bits of data are transmitted from the main station to control the pulse current supplied to the field coil of the pulse motor. In the case of such control, it is necessary to transmit the control data to the terminal equipment at an interval shorter than the period for controlling the rotation of the pulse motor. Also, when the main station produces the control signal on the basis of an operating position detection signal transmitted from the terminal station, the position detection signal must be transmitted from the terminal station to the main station at a high speed.

SUMMARY OF THE INVENTION

With a view to solving the problems and satisfying the requirements of the communication system described above, it is a primary object of the present invention to provide a communication control method and apparatus suitable for application to a communication system in which data having a relatively small number of bits are transmitted at a high speed between a main station and a plurality of I/O systems.

According to the present invention, which achieves the above object, a main station and a plurality of I/O systems are connected by a closed-loop transmission line to form a communication network, and the communication line comprises a data channel and a clock signal channel extending in parallel to the data channel. Predetermined data bit lengths are allotted to the individual I/O systems respectively, and a clock signal is transmitted from the main station to the I/O systems by way of the clock signal channel. The number of pulses of this clock signal is equal to the total sum of the data bit lengths allotted to the I/O systems. Data from the main station are transmitted to the I/O systems by way of the data channel in synchronism with the clock signal transmitted by way of the clock signal channel.

Among the train of clock pulses applied to a clock pulse input part at each of the I/O systems, the number of clock pulses allotted to the particular station is fetched by the I/O system for the head of the train of clock pulses, and the remaining clock pulses are not fetched or bypass that I/O system. The train of remaining clock pulses is transmitted from a clock pulse output part of that I/O system toward the succeeding I/O systems. During the period of time of fetching the clock pulses, each I/O system fetches the data from the data channel in synchronism with the clock pulses.

With the same timing as the data fetch timing, data from a data output part of each I/O system is transmitted to the main station by way of the data channel. Also, at timing where no clock pulses are fetched by the particular station, data received at a data input part of each I/O system bypasses that I/O system and is sent out intact from the data output part to the data channel.

BRIEF DESCRIPTION OF THE DRAWINGS

FIG. 4 is a block diagram schematically showing the structure of another form of the communication network controlled by another embodiment of the present invention.

FIGS. 5A–5G are signal timing charts illustrating the operation of the communication network shown in FIG. 4.

DESCRIPTION OF THE PREFERRED EMBODIMENT

Preferred embodiments of the present invention will now be described in detail with reference to the drawings.

Figure 1:
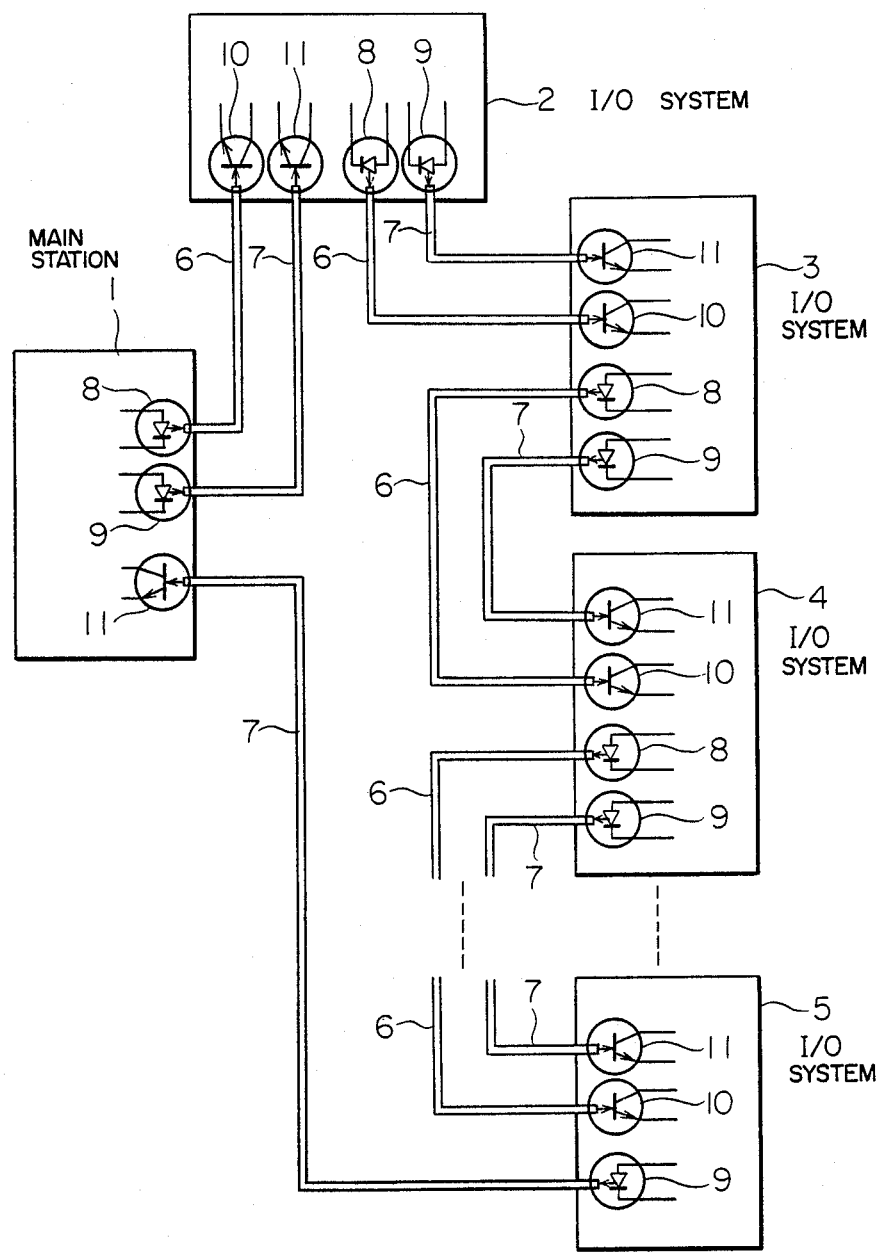
FIG. 1 is a block diagram schematically showing the structure of a communication network controlled by an embodiment of the present invention.

FIG. 1 is a block diagram schematically showing the structure of a communication network controlled by an embodiment of the present invention.

Referring to FIG. 1, a main station 1 has the function of controlling data communications in the communication network. A clock pulse output part 8 of the main station 1 includes a light emitting element, for example an LED generating a clock pulse signal in the form of an optical signal. The optical output signal from the clock signal output part 8 passes through a clock pulse channel 6, in the form of optical fibers, to be applied to a clock pulse input part 10 of a first-stage I/O system 2. The clock pulse input part 10 includes a light receiving element, for example, a photo transistor.

At the same time, serial data bits from a serial data output part 9 of the main station 1 are transmitted in the form of also an optical signal to a serial data input part 11 of the first-stage I/O system 2 by way of a serial data channel 7. The serial data output part 9 of the main station 1 includes a light emitting element, for example an LED, and the serial data input part 11 of the I/O system 2 includes a light receiving element, for example a photo transistor.

The optical signals from the clock pulse output part 8 and serial data output part 9 of the first-stage I/O system 2 are applied through a clock pulse channel 6 and a data channel 7, respectively, to a clock pulse input part 10 and a serial data input part 11, respectively, of a second-stage I/O system 3.

Output parts 8 and 9 of the second-stage I/O system 3 are similar connected through channels 6 and 7 to input parts 10 and 11 of a third-stage I/O system 4 respectively.

A required number of such I/O systems are connected in cascade. A serial data output part 9 of a final stage I/O system 5 is connected by a data channel 7 to a serial data input part 11 of the main station 1. Thus, as shown in FIG. 1, the main station 1 and the plural I/O systems 3, 4, . . . , 5 are connected into a loop network by two channels, that is, a clock pulse channel and a serial data channel.

Although not shown in FIG. 1, each of the I/O systems is provided with various functional parts, a microprocessor, etc., so that required data can be fetched to control the terminal equipment on the basis of the data and so that clock pulses and data not directed to the particular station can be transferred to the succeeding I/O systems, as will be described in detail later with reference to FIG. 3.

Figure 2:
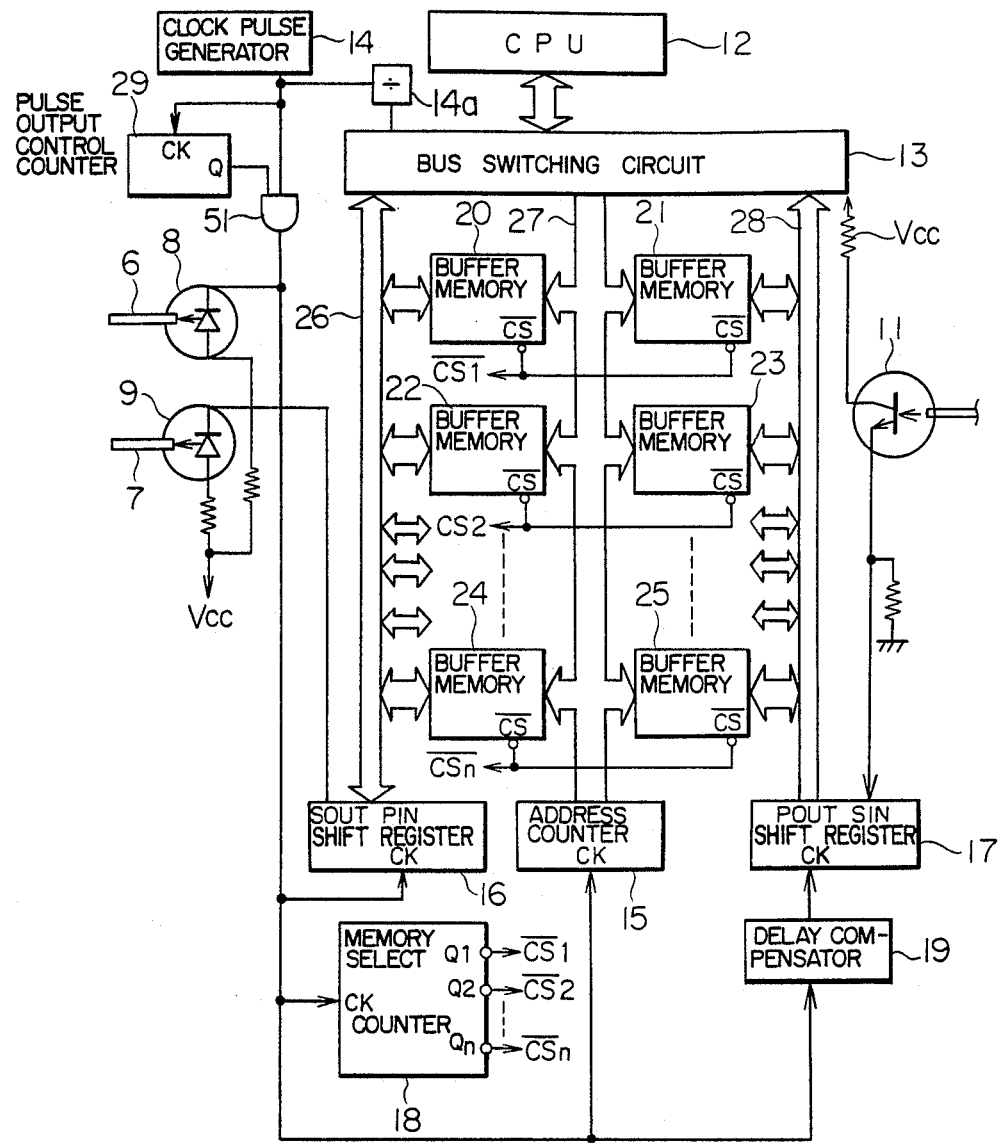
FIG. 2 is a block diagram showing in detail the internal structure of the main station shown in FIG. 1.

FIG. 2 is a block diagram showing in detail the internal structure of the main station 1.

Referring to FIG. 2, the clock pulses are generated by a clock pulse generator 14 and supplied through an AND gate 51 to the clock pulse output part 8 which includes, for example, an LED. The clock pulses are converted into a pulsating optical signal by the LED, and this optical signal appears on the clock pulse channel 6.

At the same time, the clock pulses are counted by a clock pulse output control counter 29. An output of high level appears continuously from an output terminal Q of the counter 29 until the counter 29 counts a predetermined number of clock pulses. The counter output turns then into its low level and remains at the low level until the counter 29 counts up.

The AND gate 51 is opened and closed depending on the level of the Q output of the counter 29. Therefore, the period of the clock pulses supplied to the clock pulse output part 8 is controlled in such a way that, after application of a predetermined number of clock pulses, application of the clock pulses is ceased for a predetermined period of time. Such clock pulses are converted into the optical signal which appears on the clock pulse channel 6.

The clock pulses from the clock pulse generator 14 are supplied also to a clock input terminal CK of an address counter 15, so that the address output data is incremented by one in synchronism with the end of each period of clock pulse output control in the manner described above.

The clock pulses are also supplied to a clock input terminal CK of a memory select counter 18 to be counted by the counter 18. This memory select counter 18 has output terminals $Q_1, Q_2, \ldots, Q_n$ corresponding to the I/O systems 2, 3, 4, . . . , 5 respectively, and an output of low level $CS_1$, $CS_2$, or $CS_n$ appears at one of the output terminals $Q_1$ to $Q_n$ selectively at timing programmed according to the number of data bits allotted to the respective I/O systems (the information units of the I/O systems).

As a result of the appearance of an output of low level at one of the output terminals $Q_1$ to $Q_n$ of the memory select counter 18, one of buffer memory pairs 20, 21; 22, 23; . . . ; 24, 25 is selected and enabled.

In the buffer memory pairs shown in FIG. 2, the left-hand ones 20, 22, . . . , 24 are output data buffer memories, and the right-hand ones 21, 23, . . . , 25 are input data buffer memories. The uppermost memory pair 20, 21 corresponds to the first-stage I/O system 2, and the lowermost memory pair 24, 25 corresponds to the final-stage I/O system 5. In this manner, the individual memory pairs correspond to the specific I/O systems respectively.

When one of the memory pairs is selected, data bits stored in the output data buffer memory of the selected pair are read out from the address specified by the address data applied from the address counter 15 and are supplied to an input terminal PIN of a serial data output shift register 16.

The serial data bits appearing from an output terminal SOUT of the serial data output shift register 16 are converted into an optical signal by the serial data output part 9 (which includes, for example an LED), and the optical signal is transmitted to the outside by way of the data channel 7.

On the other hand, serial data bits supplied from the serial data input part 11 (which includes, for example, a photo transistor) are supplied to an input terminal SIN of a serial data input shift register 17 and appear as parallel data bits from an output terminal POUT of this shift register 17.

The parallel data bits from the shift register 17 are stored at the address, determined by the output of the address counter 15, of the input data buffer memory in the enabled memory pair.

The clock pulses from the clock pulse generator 14 are also applied to a clock pulse delay compensation circuit 19. This clock pulse delay compensation circuit 19 stores previously the value of a delay time required for the clock pulse signal to return to the main station 1 again after it has been sent out from the output part 8 of the main station 1 and passed through the individual I/O systems. On the basis of the stored value of the delay time, the delay compensation circuit 19 acts to adjust the timing of the clock signal applied to a clock input terminal CK of the serial data input shift register 17. Any suitable one of known delay circuits can be used as this delay compensation circuit 19. As another means, a clock pulse channel similar to that extending between the I/O systems may be provided between the main station 1 and the final-stage I/O system 5 in FIG. 1, so that the main station 1 receives the clock signal returning from the final-stage I/O system 5 and continuously detects the difference between the clock signal transmission and reception times, so that, on the basis of the detected time difference, the timing of applying the clock signal to the serial data input shift register 17 can be adjusted.

Data stored in the input data buffer memories 21, 23, ..., 25 are read out through a bus switching circuit 13 under command of a CPU 12 which controls the buffer memory access timing. For the purpose of the buffer-memory access timing control by the CPU 12, a clock signal obtained by dividing the frequency of the clock pulses generated from the clock pulse generator 14 is used. That is, the clock pulse frequency is divided in frequency divider 14a by a predetermined value to obtain a frequency-divided clock signal, and, in synchronism with this frequency-divided clock signal, the bus switching circuit 13 is controlled in such a manner that, when the clock signal is in its high level, the CPU 12 can make access to the buffer memories, but, when the clock signal is in its low level, the buffer memories can be accessed for reading out data from outside of the main station 1. This bus switching circuit 13 may be any suitable one of known gate circuits.

For the output data buffer memories 20, 22, ..., 24 also, the CPU 12 carries out similar bus switching control, and data are written in those memories under control of the CPU 12.

Figure 3:
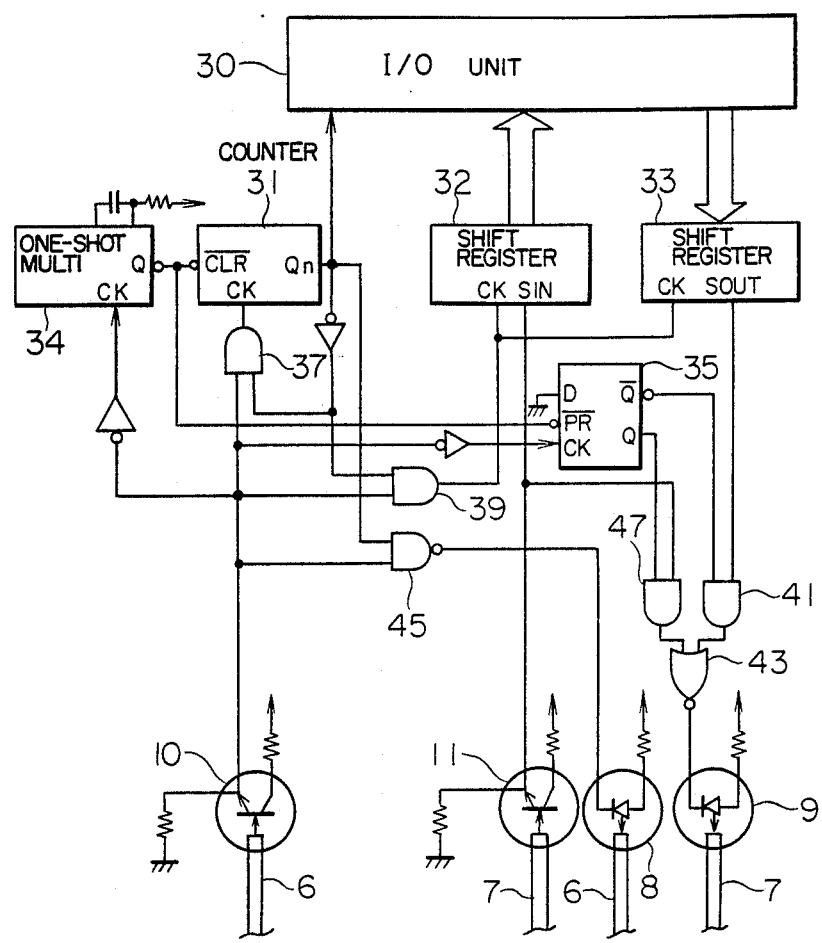
FIG. 3 is a block diagram showing in detail the internal structure of one of the I/O systems shown in FIG. 1.

FIG. 3 is a block diagram of an interface part of one of the I/O systems 2, 3, 4, ..., 5 shown in FIG. 1. These I/O systems have substantially the same structure and operate substantially in the same way. Therefore, the structure and operation of only the I/O system 2 will be described.

Referring to FIG. 3, an interface reset one-shot multivibrator 34 is a retriggerable one. An output appearing at an output terminal Q of the multivibrator 34 is inverted into its low level when no clock pulse is applied to a clock input terminal CK within a predetermined period of time. As a result, a data bit number counter 31 is cleared, and, at the same time, a flip-flop 35 is set.

When the data bit number counter 31 is cleared as described above, an output of low level appears at an output terminal $Q_n$ of the counter 31. As a result, AND gates 37 and 39 are opened, and a NAND gate 45 is closed. Therefore, the data bit number counter 31 counts the clock pulses applied from the clock pulse input part 10.

The same clock pulses are applied also to a clock input terminal CK of a data input shift register 32 through the AND gate 39. Therefore, serial data bits supplied from the serial data input part 11 are registered in the data input shift register 32, until the count of the data bit number counter 31 attains the full count and an output of high level appears at its output terminal $Q_n$. The serial data bits registered in the data input shift register 32 are supplied to an I/O unit 30 as parallel data bits. The I/O unit 30 is connected to a piece of terminal equipment, for example, a printer, a personal computer, a measuring instrument, or the like (not shown). The I/O unit 30 converts the parallel data bit input into a signal format required for controlling the terminal equipment and applies such a signal to the terminal equipment. Also, the I/O unit 30 converts data from the terminal equipment into a signal format required for data communication and applies such a parallel data bit signal to a data output shift register 33.

The clock pulses applied to the data input shift register 32 are also applied to a clock input terminal CK of the data output shift register 33. At this time, the flip-flop 35 is reset by the clock input and an output of high level appears at its output terminal $\overline{Q}$ to open an AND gate 41. Therefore, serial data bits supplied from the I/O unit 30 and registered in the data output shift register 33 are supplied to the serial data output part 9 through the AND gate 41 and a NOR gate 43.

At this time, the succeeding I/O systems are not placed in a state prepared for receiving the clock signal. Accordingly, the flip-flop 35 in each of those I/O systems is in a set state, and an AND gate 47 in each of those I/O systems is opened.

Therefore, in each of the I/O systems, serial data bits supplied to the data input part 11 of that I/O system from the I/O system in the preceding stage pass through the AND gate 47 and NOR gate 43 to be transmitted intact to the I/O system in the succeeding stage from the data output part 9.

When the count of the data bit number counter 31 attains the full count, an output of high level appears at its output terminal $Q_n$ to close the AND gate 37 connected to the clock input terminal CK of the counter 31. This output appearing at the output terminal $Q_n$ of the counter 31 is fixed at its high level until the counter 31 is reset by the Q output of the one-shot multivibrator 34.

Since the AND gates 37 and 39 are closed, and the NAND gate 45 is opened, the clock pulses applied to the clock pulse input part 10 appear intact from the clock pulse output part 8.

Further, since the flip-flop 35 is set at this time, and its Q and $\overline{Q}$ outputs open and close the AND gates 47 and 41 respectively, serial data bits supplied to the serial data input part 11 pass through the AND gate 47 and NOR gate 43 to appear intact from the serial data output part 9.

Thus, in the I/O system shown in FIG. 3, data bits of the number required for the particular station, as determined by the setting of the data bit number counter 31, are taken into the I/O unit 30, and data bits of the required number are also generated from the I/O unit 30. Thereafter, clock pulses and serial data bits transmitted from the main station 1 to this I/O system merely pass through the I/O system to be transmitted intact to the succeeding I/O system without being held therein.

All of the I/O systems connected in the loop network as shown in FIG. 1 carry out the operation described above. Thus, the individual I/O systems can sequentially transmit and receive data of their predetermined required numbers of bits respectively.

FIG. 4 is a block diagram schematically showing the structure of another form of the communication network controlled by another embodiment of the present invention, and FIG. 5 is a signal time chart illustrating the operation of the communication network shown in FIG. 4.

FIG. 4 shows that the main station 1 and the I/O systems 2 to 4 are connected by the channels 6 and 7 to form a loop network. Data lengths allotted to the I/O systems 2, 3 and 4 are 8 bits, 4 bits and 6 bits respectively. In other words, the data bit number counters 31 in the I/O systems 2, 3 and 4 are set to count up when they count 8 clock pulses, 4 clock pulses and 6 clock pulses respectively.

By the combination of the clock pulse generator 14 and clock pulse output control counter 29 in the main station 1, clock pulses, the number of which is equal to the total sum of the numbers of data bits allotted to the I/O systems, that is, 18 clock pulses are continuously transmitted from the main station 1, and the transmission of the clock pulses is then ceased for a predetermined period of time T, as shown in FIG. 5(A). Such an operation is repeated.

The period of time T is selected to be longer than a period of time Ts as shown in FIGS. 5(A) and 5(B). The latter period of time Ts sets such a time limit that, when no clock pulses are applied for a period of time longer than Ts, the Q output of the interface reset one-shot multivibrator 34 in each I/O system is turned to its low level, thereby clearing the data bit number counter 31.

Suppose first that no clock pulses are sent out from the main station 1 in the communication system shown in FIG. 4. Under such a situation, the Q output of the interface reset one-shot multivibrator 34 in each of the I/O systems 2, 3 and 4 is at its low level, and the associated data bit number counter 31 is in its cleared state.

At time $t_0$ in FIG. 5(A), the main station 1 starts to transmit clock pulses toward the first-stage I/O system 2. Then, as shown in FIG. 5(B), the Q output of the interface reset one-shot multivibrator 34 is turned to its high level, and the data bit number counter 31 starts to count the clock pulses.

At the same time, input data bits are fetched by the I/O unit 30, and output data bits are sent out toward the main station 1 through the succeeding I/O systems, as described already. At this time, no clock pulses are sent out from the clock pulse output part 8 of the first-stage I/O system 2, as shown in FIG. 5(C).

At time $t_1$, the data bit number counter 31 of the first stage I/O system 2 has counted 8 clock pulses, and the $Q_n$ output thereof is turned to its high level. Due to the appearance of the $Q_n$ output of high level, clock pulses and serial data bits transmitted from the main station 1 pass through the first-stage I/O system 2 without being held therein and are sent out toward the second-stage I/O system 3, as will be seen in FIG. 5(C).

When the clock pulses are received by the second-stage I/O system 3, the Q output of the interface reset one-shot multivibrator 34 in the second-stage I/O system 3 is turned to its high level as shown in FIG. 5(D), and the data bit number counter 31 starts to count the clock pulses.

Until that counter 31 counts 4 clock pulses corresponding to 4 data bits, the I/O unit 30 in the second-stage I/O system 3 fetches input data bits and sends out output data bits toward the main station 1.

At this time, no clock pulses are sent out from the clock pulse output part 8 of the second-stage I/O system 3 as shown in FIG. 5(E).

At time $t_2$, the data bit number counter 31 of the second-stage I/O system 3 has counted 4 clock pulses, and the $Q_n$ output thereof is turned into its high level. Due to the appearance of the $Q_n$ output of high level, the clock pulses and serial data bits transmitted from the main station 1 and passed through the first-stage I/O system 2 without being held therein also pass through the second-stage I/O system 3 without being held therein and are sent out toward the third-stage I/O system 4, as will be seen in FIG. 5(E).

When the clock pulses are received by the thirdstage I/O system 4, the Q output of the interface reset one-shot multivibrator 34 in the third-stage I/O system 4 is turned into its high level as shown in FIG. 5(F), and the associated data bit number counter 31 starts to count the clock pulses.

At the same time, the I/O unit 30 of the thirdstage I/O system 4 fetches input data bits corresponding to 6 clock pulses and sends out output data bits toward the main station 1. In this case, no clock pulses are sent out from the final-stage I/O system 4 as will be seen in FIG. 5(G).

In the manner described above, data are transmitted and received between the main station 1 and the I/O systems 2 to 4. Thus, for example, the main station 1 can send out a control instruction to each of the I/O systems and can receive a response to the instruction or detected data from each of the I/O systems.

In a test conducted by the inventors, clock pulses were generated at an oscillation frequency of 16 MHz, eight I/O systems and a main station were connected to form a closed loop network, and the numbers of data bits to be transmitted from and received by the individual I/O systems were set at 8 bits respectively. In the experimental communication system described above, data of 8 bits could be simultaneously transmitted from and received by the individual I/O systems at a period of 5 μsec.

The high speed described above is equivalent to a speed with which a memory in an 8-bit microcomputer system is accessed. This proves that an external I/O system can be accessed at a very high speed.

Further, as will be seen in FIG. 3, the hardware in the interface is very simple in structure. Therefore, a very inexpensive and highly reliable communication system can be constructed. Further, since any desired number of data bits can be allotted to each of I/O systems, a communication system freed from undesirable operation time losses can be provided.

It will thus be understood that according to the present invention, a main station transmits serial data bits arranged in the order of reception by individual I/O systems, and each of the I/O systems fetches the transmitted data bits during the period of counting clock pulses of a number corresponding to the number of data bits allotted to the own station. Therefore, the present invention eliminates the necessity for addition of data such as address data and total data-bit number data which have been required in prior art communication systems. The present invention provides further the following notable advantages:

(1) Data can be simultaneously transmitted and received.

(2) The hardware is simple in structure, and simple software can control the hardware. Therefore, the communication system is inexpensive and highly reliable.

(3) The period with which the I/O systems transmit and receive data is given by period of clock pulses×total sum of numbers of data bits allotted to the I/O systems+T (T: period of time of clock pulse disappearance)

Therefore, when the number of data bits allotted to the individual I/O systems is decreased, data can be transmitted and received at a very high speed.

(4) The lengths of data transmitted and received between the main station and the I/O systems are previously determined, so that the data can be stored in the memories of the main station in the form that can be directly expressed on the control software program. Therefore, the program can be prepared in a form that can be easily understood.

In the aforementioned embodiments of the present invention, optical fibers are referred to as an example of communication channel means. However, the present invention is in no way limited to the use of optical fibers, and changes and modifications may be made without departing from the scope of the disclosure. For example, those skilled in the art can easily conceive a modification in which a coaxial cable or a conductor pair for transmitting an electrical signal is used as communication channel means.

We claim:

1. A method of controlling communications in a loop communication network having a main station, a plurality of input/output (I/O) systems, and closed-loop communication channel means including a data channel and a clock pulse channel, each of said channels connecting said main station and said plurality of I/O system in a closed loop, said method comprising the steps of:

sending out a predetermined number of clock pulses from said main station over said clock pulse channel closed loop and, at the same time, sending out main station data from said main station over said data channel closed loop in synchronous relation with the clock pulses; and within each of said I/O systems on said clock pulse channel closed loop:

receiving the clock pulses and deriving from the first pulses of the received clock pulses a predetermined number of clock pulses allotted to that I/O system, the remaining clock pulses of said received clock pulses being sent out toward the succeeding I/O systems in said clock pulse channel closed loop;

fetching the main station data sent out over said data channel closed loop and received by that I/O system while that I/O system is deriving its predetermined number of clock pulses;

sending out, from that I/O system over said data channel closed loop toward the succeeding I/O systems in said data channel closed loop, I/O system data generated in that I/O system while that I/O system is fetching the main station data; and sending out, from that I/O system over said data channel closed loop toward the succeeding I/O systems in said data channel closed loop, said main station data, without fetching the main station data supplied to that I/O system when that I/O system is not deriving its predetermined number of clock pulses.

2. A communication control method according to claim 1, wherein the step of sending out the main station data comprises sending out the main station data in the form of serial data bits arranged according to the connected order of said I/O systems in said data channel closed loop.

3. A communication control method according to claim 2, further comprising the step of inhibiting sending out the clock pulses from each of said I/O systems over said clock pulse channel closed loop when a predetermined period of time has elapsed after cessation of application of the clock pulses from said main station over said clock pulse channel closed loop.

4. In an apparatus for controlling communications in a loop communication network including a main station, a plurality of input/output (I/O) systems, and closed-loop communication channel means including a data channel and a clock pulse channel, each of the channels connecting the main station and the plurality of I/O systems in a closed loop, the improvement wherein said main station comprises:

clock pulse generating means for generating clock pulses;

clock pulse control means for receiving clock pulses from said clock pulse generating means and for sending out, over the clock pulse channel closed loop at predetermined time intervals, a train of the received clock pulses, the number of pulses in the train corresponding to the total sum of the lengths of the data allotted to the individual I/O systems;

memory means, including output data buffer memories for storing data to be transmitted to the I/O systems and input data buffer memories for storing data transmitted from the I/O systems, said output data buffer memories and said input data buffer memories being provided in pairs, each pair corresponding to one of the I/O systems;

first means for receiving clock pulses from said clock pulse control means and counting the received clock pulses and for selecting the one of said pairs of output data buffer memories and input data buffer memories corresponding to one of the I/O systems when the count attains a value corresponding to the length of the data allotted to that one of the I/O systems;

second means for receiving clock pulses from said clock pulse control means and counting the clock pulses and for specifying addresses of data in the selected one of said pairs of output data buffer memories and input data buffer memories;

data output means for reading out data, from the address specified by said second means, in said selected output data buffer memory and sending out the read-out data on the data channel closed loop; and means for receiving data supplied from the I/O systems through the data channel closed loop and for storing of that data, at the address specified by said second means, in said selected input data buffer memory.

5. A communication control apparatus according claim 4, wherein said data output means includes means for sending out the read-out data in the form of serial data bits and said data receiving means includes means of receiving the supplied data in the form of serial data bits.

6. A communication control apparatus according to claim 5, wherein said data output means includes means for sending out the read-out data in synchronism with the sent-out clock pulses.

7. In an apparatus for controlling communications in a loop communication network including a main station, a plurality of input/output (I/O) systems, and closed-loop communication channel means including a data channel and a clock pulse channel, each of the channels connecting the main station and the plurality of I/O systems in a closed loop, the improvements wherein each of said I/O systems comprises:
- an I/O unit for transmitting data to terminal equipment connected to said I/O system and for receiving data from the terminal equipment;
- counter means for counting clock pulses supplied from the clock pulse channel and generating an output signal indicative of the counting of a number of clock pulses equal to the number of data bits allotted to that I/O system;
- means responsive to the output signal of said means for interrupting the application of clock pulses to said counter means;
- means for fetching data into said I/O unit from the data channel while said counter means is counting clock pulses;
- means for sending out data from said I/O unit of the data channel while said counter means is counting clock pulses;
- means responsive to the output signal of said counter means for sending clock pulses supplied from the clock pulse channel out to succeeding I/O systems on the clock pulse channel; and
- means responsive to the output signal of said counter means for sending data supplied from the data channel out to succeeding I/O systems on the data channel.

8. A communication control apparatus according to claim 7, wherein said data fetching means included means for fetching data in synchronism with the clock pulses being counted, and said data sending-out means includes means for sending out data in synchronism with the clock pulses being counted.

9. A communication control apparatus according to claim 8, wherein said counter means includes means for clearing the count of said counter means when the clock pulses from the clock pulse channel are not supplied to said I/O system for more than a predetermined period of time.

10. A communication control apparatus according to claim 9, wherein said data sending means included means for sending data out on the data channel in the form of serial data bits;

11. In an apparatus for controlling communications in a loop communication network including a main station, a plurality of input-output (I/O) systems, and closed loop communication channel means including a data channel and a clock pulse channel, each of the channels connecting said main station and said plurality of I/O systems in a closed loop, the improvement wherein said main station comprises:
- clock pulse generating means for generating clock pulses;
- clock pulse control means for receiving clock pulses from said clock pulse generating means and for sending out over the clock pulse channel closed loop at predetermined time intervals a train of the received clock pulses, the number of pulses in the train corresponding to the total sum of the lengths of the data allotted to the individual I/O systems;
- memory means, including output data buffer memories for storing data to be transmitted to said I/O systems and input data buffer memories for storing data transmitted from said I/O systems, said output data buffer memories and said input data buffer memories being provided in pairs, each pair corresponding to one of said I/O systems;
- first means for receiving clock pulses from said clock pulse control means and counting the received clock pulses and for selecting the one of said pairs of output data buffer memories and input data buffer memories corresponding to one of said I/O systems when the count attains a value corresponding to the length of the data allotted to said one of said I/O systems;
- second means for receiving clock pulses from said clock pulse control means and counting the received clock pulses and for specifying the addresses of data in the selected one of said pairs of output data buffer memories and input data buffer memories;
- data output means for reading out data from the address specified by said second means, in said selected output data buffer memory and sending out the read-out data on the data channel closed loop; and
- means for receiving data supplied from said I/O systems through the data channel closed loop and for storing of that data, at the address specified by said second means, in said selected input data buffer memory; and wherein each of said I/O systems comprises:
- an I/O unit for transmitting data to terminal equipment connected to said I/O system and for receiving data from the terminal equipment;
- counter means for counting clock pulses supplied from the said clock pulse channel and generating an output signal indicative of the counting of a number of clock pulses equal to the number of data bits allotted to said I/O system;
- means responsive to the output signal of said counter means for interrupting the application of clock pulses to said counter means;
- means for fetching data into said I/O unit from the data channel while said counter means is counting clock pulses;
- means for sending out data from said I/O unit on the data channel while said counter means is counting clock pulses;
- means responsive to the output signal of said counter means for sending clock pulses supplied from the clock pulse channel out to succeeding I/O systems on the clock pulse channel; and
- means responsive to the output signal of said counter means for sending data supplied from the data channel out to succeeding I/O systems on the data channel.

* * * * *